United States Patent [19]
Stout et al.

[11] Patent Number: 4,604,504
[45] Date of Patent: Aug. 5, 1986

[54] TIMER BLADE ARRANGEMENT

[75] Inventors: Garry A. Stout, Bargersville; Leroy A. Perry, Danville, both of Ind.

[73] Assignee: Emhart Industries, Inc., Indianapolis, Ind.

[21] Appl. No.: 734,826

[22] Filed: May 16, 1985

Related U.S. Application Data

[63] Continuation of Ser. No. 487,976, Apr. 25, 1983, abandoned.

[51] Int. Cl.[4] ........................ H01H 43/00; F16H 53/06
[52] U.S. Cl. ........................ 200/38 B; 74/569; 200/27 B; 200/38 C
[58] Field of Search ................... 200/38 R, 38 B, 283, 200/281, 272, 38 A, 38 F, 38 BA, 38 C, 38 CA, 27 B, 30 AA; 339/256 R, 258 R; 74/569

[56] References Cited

U.S. PATENT DOCUMENTS

| | | | |
|---|---|---|---|
| Re. 29,158 | 3/1977 | Cartier et al. | 200/283 X |
| 2,780,792 | 8/1953 | Earl | 339/256 X |
| 3,106,620 | 10/1963 | Haydon | 74/569 X |
| 3,543,589 | 12/1970 | Loughran, Jr. | 74/569 X |
| 3,752,944 | 8/1973 | Cartier et al. | 200/283 X |
| 3,978,303 | 8/1976 | Miyata | 200/1 A X |
| 4,130,744 | 12/1978 | Beecher, II et al. | 200/283 X |
| 4,381,432 | 4/1983 | Cushing | 200/38 B |
| 4,385,502 | 5/1983 | Denny et al. | 200/38 R X |

*Primary Examiner*—J. R. Scott
*Attorney, Agent, or Firm*—Robert F. Meyer; Carl A. Forest

[57] ABSTRACT

There are three spring blades held in working relationship to a camstack which provide the making of two different and distinct circuits simultaneously by substantially simultaneously closing electrical contacts carried by the blade. Of the three blades a lower level blade engages cam contours of the camstack, a middle level blade includes a follower which engages a hub portion of the camstack, while the upper level blade extends freely above the middle blade.

4 Claims, 5 Drawing Figures

TIMER BLADE ARRANGEMENT

This application is a continuation, of application Ser. No. 06/487,976, filed Apr. 25, 1983 now abandoned.

BACKGROUND OF THE INVENTION

Generally speaking, the present invention relates to a timing mechanism which comprises a camstack including a hub portion and individual cams extending from said hub portion and providing channels therebetween, at least one of the individual cams having two cam lobes of different elevations, a first spring blade engaging the one individual cam and having a first electrical contact, a second spring blade carried above the first spring blade and having a second electrical contact engaging the first electrical contact and a third electrical contact, a third spring blade carried above the second spring blade having a fourth electrical contact engaging the third electrical contact, follower means carried by the second spring blade engaging the hub portion in one of the channels and establishing a fixed air gap between the first and fourth electrical contacts when they are in a relaxed position.

In accordance with the present invention, there is provided a timer blade arrangement which not only provides for two different and distinct circuits to be selectively "turned on" but also provides for consistent air gaps between electrical contacts even though the camstack of the timing mechanism may have an error in concentricity.

The timer blade arrangement is particularly useful in those applications where functions of an appliance such as a dishwasher, washer or dryer needs to be actuated substantially simultaneously.

DETAILED DESCRIPTION OF THE INVENTION

Figure 1:
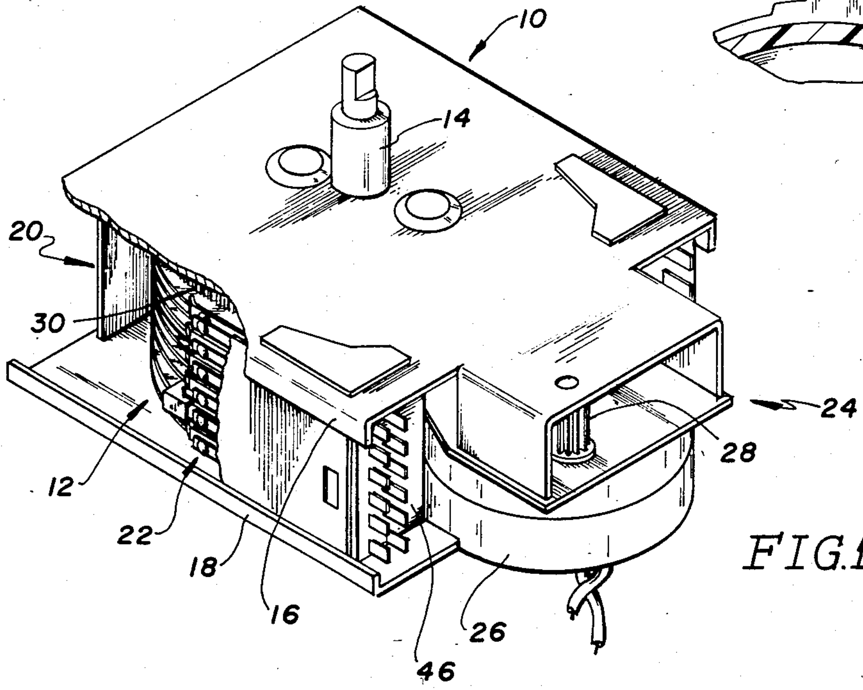
FIG. 1 is an isometric view of a timing mechanism employing the invention.

Referring now to FIG. 1, there is shown a timing mechanism 10 which in general includes a camstack 12 carried on a shaft 14 which is journalled in end plates 16 and 18 of timer housing 20. A plurality of switch means 22 are operated or opened and closed through engagement of the camstack in a manner well known in the art. Camstack 12 is rotated through a drive means 24, which in the present embodiment, includes a synchronous motor 26 having an output pinion 28 which is coupled to gear 30 of the camstack through a series of intermittent gears (not shown). Alternatively, an escapement can be coupled between the output pinion 28 and gear 30 to provide an intermittent rotary motion to the camstack.

Figure 2:
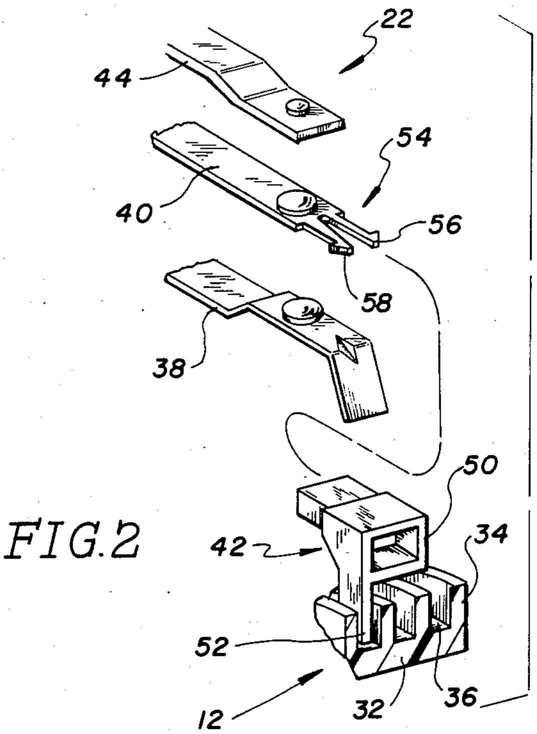
FIG. 2 is an exploded view showing a timer blade arrangement.
Figure 3:
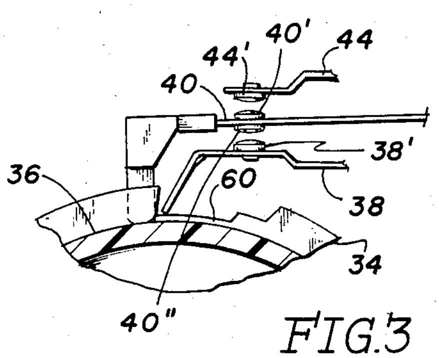
FIGS. 3–5 are similar views showing three operating modes of the timer blade arrangement.

Referring to FIGS. 2 and 3, the features of the invention can be described. Camstack 12 includes a hub portion 32 with individual cams 34 extending therefrom and providing channel 36 between the cams. At least one set of the switch means 22 includes a lower level spring blade 38, the distal end of which engages a cam 34 of the camstack, a second middle level spring blade 40 which engages the hub portion 32 within one of the channels 36 through a follower means 42 carried by the spring blade, and a third upper spring blade 44. All three of the spring blades are carried in a terminal block 46 (FIG. 1). As shown, blade 38 includes an electrical contact 38', blade 40 includes electrical contacts 40' and 40'', while blade 44 includes an electrical contact 44', all of the contacts being aligned with each other so that they may be selectively engaged with each other.

Follower means 42 includes casing 50 and a leg 52 extending therefrom to engage the hub portion of the camstack. The casing is fixedly carried on spring blade 40 through a spring means 54 which includes a pair of tongs 56 and 58 extending from the distal end of the blade, the tongs being spring loaded to engage sidewalls of the casing. With follower means 42 being carried by the middle blade and engaging the hub portion of the camstack, a constant air gap is maintained between the contacts 38' and 40' regardless of any error in camstack eccentricity. This is especially critical with the middle and lower contacts, since the lower contact sees the error in camstack eccentricity through the distal end of blade 38.

Figure 4:
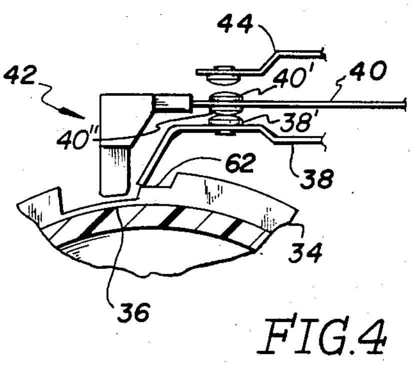
Figure 5:
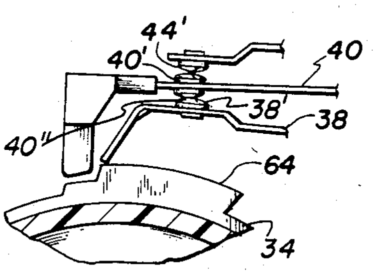

Referring now to FIGS. 3–5, the operation of the blade arrangement can be described. In FIG. 3, blade 38 is riding on the lower cam lobe 60 of a cam, follower means 42 is riding on the hub portion of the camstack and maintaining a constant air gap between the contacts. In FIG. 4, blade 38 has reached a first contour level defined by lobe 62 to close contacts 38' and 40''. Follower means 42 has disengaged from hub portion 36. In FIG. 5, blade 38 has reached a second level defined by lobe 64 to raise blade 40 to close contacts 40' and 44'' as well as contacts 38' and 40''. Thus two independent circuits can be completed substantially simultaneously when blade 38 reaches the upper lobe 64.

What is claimed is:

1. A timing mechanism comprising:

(a) a camstack including a hub portion and individual cams extending from said hub portion and providing channels therebetween, at least one of said individual cams having at least two cam lobes of different elevations, (b) a first spring blade engaging said at least one individual of said cams and having a first electrical contact, (c) a second spring blade mounted above said first spring blade and having a second electrical contact engaging said first electrical contact, and a second spring blade third electrical contact, (d) a third spring blade mounted above said second spring blade having a fourth electrical contact engaging said third electrical contact, (e) follower means mounted on said second spring blade engaging said hub portion in one of said channels and establishing a fixed air gap between said first and second electrical contacts when they are in a relaxed position.

2. A timing mechanism according to claim 1 wherein said follower means includes a casing receiving said second spring blade and a leg extending from said casing engaging said hub portion.

3. A timing mechanism according to claim 2 wherein said second spring blade includes spring means engaging said casing said to hold same on said second spring blade.

4. A timing mechanism according to claim 3 wherein said spring means includes spring loaded tongs extending from a distal end of said second spring blade and engaging said casing.

* * * * *